United States Patent [19]

Argo et al.

[11] 4,051,070
[45] Sept. 27, 1977

[54] CATALYST PREPARATION UTILIZING METAL NITRATES AND NITROGEN OXIDE SCAVENGER

[75] Inventors: Wesley B. Argo, St. Louis; James W. Edwards, Creve Coeur; Albert P. Little; William M. Lumb, both of Chesterfield, all of Mo.

[73] Assignee: Monsanto Company, St. Louis, Mo.

[21] Appl. No.: 430,017

[22] Filed: Jan. 2, 1974

[51] Int. Cl.$^2$ .................. B01J 23/26; B01J 37/00
[52] U.S. Cl. .................. 252/428; 252/430; 252/465; 252/466 PT; 252/467; 252/470; 252/472; 423/213.2; 423/213.5
[58] Field of Search ............ 252/430, 438, 470, 465, 252/466 PT, 467, 472; 423/213.5, 213.2

[56] References Cited

U.S. PATENT DOCUMENTS

| | | | |
|---|---|---|---|
| 3,438,721 | 4/1969 | Innes | 423/213.2 |
| 3,470,105 | 9/1969 | Briggs et al. | 423/213.5 X |
| 3,619,127 | 11/1971 | Hass | 423/213.5 |
| 3,661,806 | 5/1972 | Briggs et al. | 423/213.5 X |
| 3,770,659 | 11/1973 | Cosgrove et al. | 423/213.5 X |
| 3,801,696 | 4/1974 | Mark | 423/213.2 X |
| 3,853,788 | 12/1974 | Feins et al. | 252/465 X |
| 3,853,791 | 12/1974 | Feins | 252/465 |
| 3,872,030 | 3/1975 | Feins et al. | 252/465 |
| 3,947,379 | 3/1976 | Feins | 252/463 |

OTHER PUBLICATIONS

Noller, Chemistry of Organic Compounds, (1951) pub. by W. B. Saunders Co., Phila. Pa., pp. 241, 300 & 301.

*Primary Examiner*—Patrick P. Garvin
*Attorney, Agent, or Firm*—Joseph D. Kennedy; John D. Upham

[57] ABSTRACT

Provisions are taken to counter nitrogen oxide fumes produced in catalyst preparation involving metal nitrate decomposition, as by including urea or another scavenger, or by delaying calcining until used as catalyst in treating auto exhaust.

13 Claims, No Drawings

CATALYST PREPARATION UTILIZING METAL NITRATES AND NITROGEN OXIDE SCAVENGER

The present invention relates to catalysts and their preparation and use, and is particularly concerned with catalysts for removal of impurities from exhaust gases of internal combustion engines.

Catatlysts have recognized uses and value in many industrial processes. The need for controlling pollution resulting from automobile exhaust gases is at present well-recognized. Such pollution includes hydrocarbons, carbon monoxide, nitrogen oxides ($NO_x$) and other noxious gases. Catalysts have been sought which are effective for converting such noxious components to harmless materials, and catalysts fairly effective for this purpose have been developed. In general such catalysts have a metal component, as the active component, disposed on a relatively inactive catalyst support. A number of such catalysts employ noble metals or noble metal compounds as the active metal component, although various base metals have also been found effective in varing degree.

Various methods of preparing catalysts have been employed. One of the usual procedures is to impregnate a support material with a solution of metal salts, dry the support material, and calcine the resulting composition at high temperature. Nitrate salts are among the metal salts frequently used in such procedures, as the nitrate salts of metals frequently have the desired solubility in aqueous media. The described procedures are often effective to produce a catalyst of desired properties. However, any catalyst designed for pollution control are subject to comparison cost-wise with other such catalysts, as well as with other potential modes of control. The high temperature calcination step contributes considerably to the cost of the catalyst preparation. There is a capital cost for the heating apparatus involved in the calcination as well as the energy cost. Moreover, the nitrate salts decompose in the calcination, giving off nitrogen oxides which constitute a pollution problem. The nitrogen oxides can be absorbed in appropriate solutions, or otherwise rendered innocuous in recognized ways, but this contributes further to the capital and other costs of the catalyst preparation.

SUMMARY OF THE PRESENT INVENTION

The present invention involves the use of a nitrogen oxide scavenger to suppress evolution of nitrogen oxides in the preparation of catalysts with metal nitrates. The invention further involves the omission of a high temperature calcination step in the preparation of catalyst from metal nitrate, and reliance upon use in contact with exhaust gases to complete catalyst preparation. The invention also involves a procedure in which the metal nitrate-containing catalyst preparation is heated, but only to a temperature circa 200° C, sufficient to decompose the nitrate, and is then ready for placement in the intended use environment.

The invention is also directed to a composition adapted for catalyst preparation comprising an alumina support, a metal nitrate salt, and an amido material as a nitrogen oxide scavenger.

In the past it has been customary to calcine catalyst preparations containing metal salts with the object of converting such salts to oxides or some other form for desired activity. This was apparently considered necessary, as it was very common practice despite the additional cost. It has now been found that such a calcination step is unnecessary, as the catalysts can be activated, to the extent activation is necessary, by being subjected to high temperatures in the environment of intended use. Moreover, upon heating nitrates give off nitrogen oxides which constitute a pollution problem. The control of such pollutants generally involves fairly costly equipment and procedures. However, it has now been found that the need for equipment or additional procedures can be avoided by the use of a scavenger for the nitrogen oxides. The scavenger is simply incorporated in the catalyst and the nitrogen oxide evolution is substantially suppressed. There may still be some minor initial evolution upon heating, but any problem with respect to it is substantially diminished.

The present invention is especially concerned with noble metal catalysts adapted for the treatment of exhaust gases from automotive engines. Such catalysts containing noble metal on alumina, particularly palladiumm on alumina, have been found effective. The present invention is also particularly concerned with such catalysts having chromium present as an additional active component or promoter or extender. Either or both of the palladium and chromium can be added to the support as a nitrate, and the nitrogen oxide scavenger and treatment procedures described herein are useful in preparing catalysts therefrom. Urea or urea polymers are particularly effective as the scavenger in such catalyst preparations.

DETAILED DESCRIPTION OF THE INVENTION

In accordance with the present procedure, effective catalysts are prepared by incorporating metal nitrate salts into a support material, drying the material, and further activating the material by heating it to high temperatures under conditions of intended use. In particular, a support is impregnated from solution with noble and base metal nitrates and an $NO_x$ scavenger, such as urea, dried at a low temperature, and while still in a form containing metal nitrates, contacted with automotive exhaust gases at elevated temperatures, thereby causing decomposition of the nitrates. In this procedure, heating at any relatively moderate temperature can be employed for drying, so long as it does not cause extensive decomposition of the nitrate salts. Ordinarily the drying temperature will be above 100° C, but drying can, of course, be accomplished at much lower temperatures, especially if sub-atmospheric pressures are employed. Temperatures between 100° and 120° or 140° C will generally be convenient for drying. Drying without decomposition of the nitrates can be accomplished by simply keeping the bed temperature below a temperature where extensive decomposition occurs. The use of moderate drying conditions may also contribute to desireable physical properties of the catalyst by avoiding rapid vaporization which might occur at high temperatures. However, one of the main advantages of moderate heating is simply to avoid the energy input necessary for higher temperature and more extensive heating. The omission of the step of high temperature calcination in a furnace will certainly save a significant expense, and property data indicates that the step can be omitted with little change or deterioration in catalyst properties. Moreover, the avoidance of nitrate decomposition in manufacture avoids the need for $NO_x$ control apparatus in conjunction with the catalyst manufacture (assuming $NO_x$ suppression was not accomplished by a scavenger).

The temperature which causes decomposition of nitrate salts will vary with the particular nitrate salts and other factors. Chromium nitrate, for example, when heated with an alumina support will ordinarily decompose at about 140° C, but when urea is included in the mixture, the decomposition apparently starts around 190° C, as indicated by differential thermal analysis. It will be recognized that decomposition points will often vary from those reported in the literature for pure compounds. Moreover, the rate of heating and other factors may affect the decomposition temperature. For example, a large bed of catalyst containing urea was found to decompose with exothermic reaction commencing at a bed temperature of 150°-155° C when heated in an oven with gases at 162° C. The fact that a self-sustaining exothermic reaction is obtained is a further beneficial effect of the urea. It makes it possible to utilize less applied heat in the curing of the catalyst and demonstrates that green catalyst will more readily and rapidly attain curing temperature when first subjected to contact with automotive exhaust gases.

In another aspect the present invention involves impregnating a support from solution with metal nitrates and an $NO_x$ scavenger, such as urea, drying the material, and calcining at high temperatures, e.g. 500° to 700° C. While this procedure incurs the expense of calcining, it still has the advantage of suppression of $NO_x$ evaluation. Another alternative is to heat the catalyst to around 200° C or some temperature sufficient to cause substantial decomposition of the nitrates, and then to rely upon heating incurred under actual use conditions to complete the preparation of the catalyst.

It is contemplated that the $NO_x$ scavenger employed herein shall be in intimate admixture in the catalyst. The nitrate salts are, of course, well dispersed in the catalyst and it is necessary for the scavenger to be in close proximity to the salts. Thus it is preferred to impregnate the catalyst support with the scavenger from solution. This can conveniently be done by dissolving the scavenger in the same solution as the nitrate salts, thus lessening the number of impregnating solutions to monitor. If the scavenger is reasonably soluble, as is urea, the addition of the scavenger to the wet catalyst impregnate is in effect equivalent to adding it from solution. The simple physical admixture of scavenger with the catalyst is effective to some extent, particularly if it is finely ground, but it is difficult to maintain a uniform blend. Also the presence of a separate solid phase scavenger, such as urea, increases the probability of its melting and adhering to the walls of treatment apparatus, such as a rotary calciner. Moreover, with poorly dispersed scavenger it would be necessary to employ higher, and possibly undesireably high, concentrations to obtain the intended degree of $NO_x$ supression.

The amounts of $NO_x$ scavenger utilized in the present catalysts can be varied considerably. A sufficient amount should ordinarily be used, but there is usually no disadvantage in using an excess, other than the possible additional expense involved. Generally it will be desirable to provide sufficient scavenger to react with all the $NO_3$ anion involved, and to provide the proper stoichiometric equivalent amount of scavenger for this purpose, or a slight excess, such as up to 1½ stoichiometric equivalents. Less than stoichiometric amounts will have some value in decreasing $NO_x$ evaluation; but will not ordinarily give substantially complete suppression. For some purposes, use of one-half stoichiometric equivalent may have some value, but ordinarily it will be adviseable to have at least about one stoichiometric equivalent present. The actual quantity of scavenger needed will vary with the quantity of metal nitrate in the catalyst, as well as with the number of nitrate groups in the formula of the metal nitrate. It will also be appreciated that some scavengers have more groups available for reaction than do other scavengers, e.g. urea has two $-NH_2$ groups available for reaction. Moreover, urea is relatively low in molecular weight compared to many metal salts. The parts of metal component (calculated as metal) in catalysts are often in the range of from less than 0.1 weight parts (for noble metals) up to 10 or so weight parts, and seldom exceed 20 weight parts per 100 weight parts support. The weights, calculated as nitrate salt, will, of course, be much higher. However, the weights of scavenger employed will often be in the range of about 5 to about 15 or 20 weight parts per 100 weight parts support.

With chromic nitrate as the metal nitrate, and urea as the scavenger, reactions which may occur can be summarized:

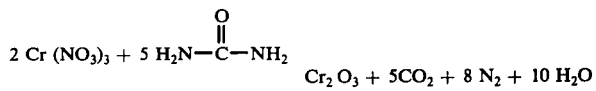

$$2\ Cr(NO_3)_3 + 5\ H_2N\overset{\underset{\displaystyle\|}{O}}{C}NH_2 \longrightarrow Cr_2O_3 + 5CO_2 + 8\ N_2 + 10\ H_2O$$

Thus it appears that five moles of urea are needed to react with 2 moles of chromic nitrate. It will be recognized that there could be some variation in this ratio, depending upon the reactions involved and the resulting products. For example, trivalent and hexavalent chromium are both possible form of chromium resulting from decomposition of chromium salts, and these products would involve different stoichiometries. However, it has been found that about 3 moles of urea to 1 mole of chromic nitrate produces good results, which indicates that a slight excess over a stoichiometric equivalent by the above equation is satisfactory. The use of scavengers is particularly illustrated herein with respect to catalysts containing palladium and chromium as components. Such components can be employed in widely varying amounts, but the palladium, calculated as metal, is suitably in the range of 0.001 to 0.1 weight parts, and the chromium, calculated as metal, in the range of 0.1 to 10 weight parts, per 100 weight parts of support. Higher amounts of palladium can be used, up to 0.5 weight parts or more, but such amounts are not necessary, and palladium is an expensive and scarce material. Platinum or other noble metals can, if desired, be used to replace all or part of the palladium in the foregoing weight parts. The amount of chromium will usually be in the range of 1 to 5 weight parts. With this amount of chromium, added as chromic nitrate, the amount of urea if used as scavenger, will usually be about 3 to 16 weight parts, per 100 weight parts support. The scavenger as used herein will have significant value when there is an appreciable amount of nitrate in the composition, such as an amount of metal nitrate, calculated as metal, to give at least 0.1% weight parts in the catalyst, or even more significantly at least about 1 weight parts, the weight parts being based on 100 weight parts support.

For the scavenger herein it is desireable to use materials which react with nitrate compounds and nitrogen oxides or acids to suppress the evolution of nitrogen oxide gases. It is also to be understood that the scavenger will remain in the catalyst under usual handling and moderate heating conditions, that is that it will be non-volatile so far as ready vaporization from the catalyst support is concerned. It is desireable that the scavenger not have very high vapor pressure or tendency to volatilize at temperatures up to 150° C or so. It is also desireable that the scavengers not produce any undesireable gaseous pollutants and certainly advantageous if reaction of the scavenger with the nitrogen oxide components of the catalyst produces only water, nitrogen, and possibly carbon dioxide, or other innocuous products. Since the conversion of nitrates to nitrogen involves a reduction, the scavengers can be considered reducing agents, and reducing agents are good condidates for use as scavengers herein. However, it is not essential that the scavengers be strong reducing agents, or effective to reduce the metal components to the metallic state, as the metal components are effective in various oxidized states, such as oxides or other forms, and in some applications alternate between oxidized and reduced states in use.

As the scavenger in the present invention it is preferred to use amides, the amides being materials characterized by presence of

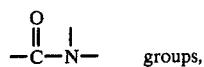 groups, with the amides being preferred, in which the nitrogen is unsubstituted, i.e. in which the amino group is primary,

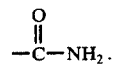

The various amides of carboxylic (including carbonic) acids are included, and the amide compounds can contain one or a plurality of amide groups. Such amides include, for example, urea, formamide, acetamide, propionamide, adipamide, benzamide, etc. There is some advantage in using lower amides, i.e. those lower aliphatic amides containing no more than six carbon atoms, as there is a higher number of amido groups for unit of molecular weight in such compounds. The amides include polymeric as well as monomeric amides, e.g. urea-formaldehyde resins, melamine formaldehyde resins, etc. Polyamides such as polyacrylamide, polyamide resins (nylon or related diamine-dicarboxylic acid condensates) or other polyamine-polycarboxylic acid condensates can be used, but many such materials are relatively expensive compared to such simple materials as urea. The amino group apparently provides one of the reactive sites in the reaction of the amides, such as urea, with the nitrogen compounds, and this is usually a primary group. However this is not essential as good results can be obtained with urea-formaldehyde resins or dimethylol urea. Amines themselves can react with nitrogen oxides, but most simple amines are relatively volatile and would not readily be retained in catalyst compositions. However, such amines as decyl amine, hexamethylene diamine, tetramine, melamine, etc. have relatively high boiling points and appear suitable for use as scavengers, and non-volatile amino materials in general are suitable. Urea, either as such, or in its various forms and derivatives, can suitably be used herein. For example, urea, N,N'-dimethylurea, urea hydrochloride, urea phosphate, urea sulfonate, urea resins, etc.

The scavengers utilized heren are in general relatively stable materials which can be present along with the metal nitrates in the catalyst compositions under ordinary ambient conditions, but which will react to suppress $NO_x$ evolution when the compositions are heated to decompose the nitrates. In the impregnation procedure as usuallly employed, the metal nitrates and scavenger are both incorporated into the catalyst composition, rather than prereacted to put the metal into elemental or other form in place of the nitrate salt. It is, of course, desireable that the scavengers not interfere with the activity of the catalyst, and therefore it will generally be adviseable to avoid any materials known to be poisons for the particular catalyst utilized. Similarly, it will be adviseable to avoid materials which might cause a pollution problem, although in view of the small amount of material involved this is not of great significancce except when extremely noxious materials are involved.

In employing catalysts in accordance with the present invention to remove hydrocarbons and carbon monoxide from automotive exhaust, oxidizing conditions are employed and it is generally advantageous to have sufficient oxygen present at almost all times to oxidize oxidizable exhaust components, and to avoid reducing conditions during any substantial periods of engine operation. Supplemental air can be added to the exhaust stream to insure sufficient oxygen, which may be particularly appropriate if the catalyst is used in an oxidation converter downstream from a converter designed to remove $NO_x$ constituents under reducing conditions. The catalyst can be used for oxidation purposes without any supplemental air when an engine is operated on the lean side of the stoichiometric air-to-fuel ratio, but supplemental air may be needed when engine operation on the average is on the rich side of stoichiometric. The exhaust gases themselves, and possibly reactions involving such gases, provide the heat necessary to attain temperatures for oxidation of pollutants over the catalysts, temperatures in the range of from about 600° C up to 900° C or higher being attained, depending upon modes of engine operation, location of the catalytic converter, and presence or absence of supplemental air.

In the present invention alumina is usually used as a support, particularly a transition alumina. By the term transition alumina is meant an alumina which is essentially alumina other than alpha-alumina and also other than certain hydroxidesof aluminum. Reference is made to Technical Paper No. 10, second revision, from the Alcoa Research Laboratories. On page 9, various phases of alumina are enumerated. The following alumina phases are not generally components in the finished catalysts of the present invention.

| | |
|---|---|
| alpha-alumina tri-hydrate | Gibbsite |
| beta-alumina tri-hydrate | Bayerite |
| — | Nordstrandite |
| alpha-alumina monohydrate | Boehmite |
| beta-alumina monohydrate | Diaspore |
| alpha-alumina | Corundum |

The use of substantial quantities of the above cited phases is not generally made. Small amounts of such alumina phases may be present, but are not the preferred starting materials for preparing the catalysts of the present invention. A preferred support for the catalysts of the present invention is composed predominantly of a transition alumina. Thus, a preferred alumina support for the catalysts of the present invention may be composed predominantly of one or more of the alumina phases typified by various forms of gamma or eta alumina, or theta, iota, chi, kappa aluminas, among others.

The transition alumina employed may have other elements present, either in impurity form, or from deliberate addition during manufacture. Soda above certain levels has been mentioned as being deleterious. Other components may have been added to aluminas during preparation for various reasons, for example silica as a stabilizer. The palladium-chromium active system taught herein does not require silica. If support stabilization is required, rare earths as taught herein are preferred. It is preferred to avoid most impurities, but all impurities are not harmful and can be present if not causing a substantial detrimental effect upon the catalyst composite with respect to its basic nature as characterized by the desirable properties taught herein. While alumina is often the carrier of choice, the present invention is applicable to catalysts using various other carrier materials, generally to any carrier materials used in the art. Included, for example, are alumina silicates, aluminum gels, magnesium gels, refractory oxides of various other metals, such as thoria, zirconia, magnesia, etc.

EXAMPLE 1

A palladium and chromium on alumina catalyst was prepared with incorporation of urea in the catalyst preparation. An 8.2 gram amount of urea was dissolved in 30 ml. distilled water and 0.5 gram of a 10% aqueous solution of $PD(NO_3)_2$ was added, and the resulting solution was diluted to 40 ml. A 19.2 gram amount of $Cr(NO_3)_3.9H_2O$ was dissolved in the solution, which was then diluted to 69 ml. The solution was used to impregnate 100 grams of a gamma alumina, using the minimum solution technique, i.e. with the amount of solution being no more than needed to completely wet the support with no substantial excess. The wet material was stirred for 10 minutes and dried in a rotary dryer to 120° C. The dried weight was 123 grams and the material had a pale blue color. The material was placed in a furnace at 350° C. No $NO_x$ fumes were visible initially or as the temperature was raised to 600° C. No fumes were detected upon observation during one hour. The calcined weight was approximately 102 grams. The catalyst analyzed as having 0.048% by weight palladium, and 2.47% by weight chromium. The catalyst was subjected to Spex Mill attrition, which attrited 6.2% of the material, analyzing as 0.088% palladium and 3.14% chromium. Spex Mill attrition is a surface wear test and the analysis thus indicates a higher concentration of the actives in the layers close to or on the surface. Further Spex Mill treatment attrited 6 to 12% of the material analyzing as 0.07% palladium and 3.10% chromium.

EXAMPLE 2

An alumina support had water absorptivity of 65.4 grams water absorbed per gram alumina and density 1.05 grams/cc. An 86.5 cc solution would be suitable for use in impregnation of 126 grams of support by minimum solution technique, and was made up to have 24.1 grams $Cr(NO_3)_3.9H_2O$, 0.063 gramd $Pd(NO_3)_2$, and 10.39 gram urea. The solution is conveniently prepared by adding a dilute aqueous solution of the palladium salt to a solution of the urea in water, adding the chromium salt, and diluting to volume. The solution was mixed into the support for 10 minutes and the mixture was superficially dried by compressed air, and further dried by heating to 120° C in a rotary unit. A 9 gram sample of the "green" catalyst was removed for testing, and the remainder was calcined to temperatures of 600° C. No $NO_x$ evolution was observed as the catalyst heated up, in contrast to the usual copious evolution of such fumes from nitrate-containing compositions. The green sample was subjected to testing as an oxidation catalystfor hydrocarbons and carbon monoxide in a simulated automobile exhaust gas stream under cold start conditions. The test measured the percentage of the components converted during a four minute cycle. In the test as usually employed for comparison with a standard catalyst, the catalyst sample is conditioned in the simulated exhaust gas streamm at 500° C for 6 minutes, then cooled 3 minutes to about 90° c, after which the simulated exhaust gas at 400° C is passed through the catalyst bed for four minutes and hydrocarbon and carbon monoxide conversions are measured over that period. In testing the present green catalyst, however, the conditioning heating step was dispensed with. In the test without pre-conditioning, the catalyst had an oxidation index of 126 for hydrocarbon, and 95 for carbon monoxide, based on an assigned value of 100 for the conversion over a standard catalyst in the same test. Upon repetition with the usual preconditioning cycle, index values of 137 and 115 were obtained. The latter values are comparable to the best obtainable on this type of catalyst with the usual high temperature calcination included in the preparation. Even the values on the catalyst with no preconditioning are good, despite the fact that material is in a transient state and has not yet reached its maximum activity. The results demonstrate that the catalyst is suitably activated by temperature treatment in an exhaust gas stream. The results on the green catalyst indicate that considerable activation must be present during initial phases of or early in the four minute measurement cycle, and the short pre-conditioning heating in the exhaust gas stream is also shown to produce activation. Thus if placed in an automobile exhaust train, the green catalyst would be quickly activated.

EXAMPLE 3

A catalyst was prepared utilizing the procedure of Example 2, employing an extruded alumina support. The alumina had a water absorbtivity of 0.763 g $H_2O$/g alumina and 400 ml of impregnating solution were utilized for 499 grams support. The solution was made up to give 8.2 parts urea, 0.5 parts $Pd(NO_3)_2$, and 19.2 parts $Cr(NO_3)_3.9H_2O$ per 100 parts alumina, the parts being by weight. The impregnated material was dried by heating to 120°–140° C. A portion of the material was then calcined at 1100° F for 4.5 hours. Upon initiation of the heating, there was a slight ammonia odor, but no visible $NO_x$ vapors were seen. After 9 minutes no fumes or odor were detected. The calcination at 1100° F resulted in a volume shrinkage of only 0.2% with calcination at 1600° F and 1800° F, the volume shrinkage was only 1.8% and 3.0% respectively. Those values compare to 0.8%, 1.7% and 3.7% for a control catalyst at the same three temperatures. The uncalcined green catalyst had simulated cold start index values of 122 for hydrocarbons, and 94 for carbon monoxide (both based on 100 for a standard catalyst). After the usual test temperature conditioning, in the presence of simulated exhaust gases, the values were 132 for hydrocarbons, and 110 for carbon monoxide. A control catalyst, having no urea and conditioned in the same way, gave a hydrocarbon index of 127 and a carbon monoxide index of 107. The catalyst prepared with urea, after 36 hours aging in a sulfur dioxide poisoning test, had a hydrocarbon index of 111 and a carbon monoxide index of 97. The air jet attrition loss on the green catalyst was 6.5%, and on the catalyst after calcination was 4.9%. The green catalyst, after air jet attrition, analyzed as having 0.051% by weight palladium, and 2.44% by weight chromium, which values differed only slightly from those for a calcined sample of the samme catalyst. The green catalyst had a crush strength of 232 pounds per square inch. The uncalcined catalyst produced in this Example was found to have acceptable properties with respect to both activity and general physical properties. Except for somewhat greater susceptibility to attrition, as shown by an air jet attrition test, it was comparable in properties to good catalyst produced by a procedure involving a six hour calcination at 1100° F in air. The cold start values reported above for unconditioned green catalyst are necessarily values on a material in a transient state, as the catalytic activity improves on exposure to exhaust gases at elevated temperature, as shown by the higher indices for the conditioned catalyst. Nevertheless, the values reported for the unconditioned green catalyst, 122 for hydrocarbons and 94 for carbon monoxide, are acceptable as such values are correlatable to about 0.26 gram/mile and 2.8 gram/mile vehicle emissions in a constant volume sampling test. This is well within proposed gove.nment 1975 standards of 0.41 gram/mile hydrocarbons and 3.4 grams/mile carbon monoxide. The 50% conversion temperatures of the green catalyst in a simulated exhaust stream were 411° C hydrocarbons and 392° C for carbon monoxide. This compares to 448° C and 402° C on a control catalyst. This test further confirms suitability of green catalyst for use-activation in an exhaust stream under actual use conditions.

The cold start test, for which results are reported in Example 3 and elsewhere herein, utilized a synthetic gas mixture containing 500 ppm normal hexane, 1.6% CO, 10% $H_2O$, 2% $O_2$ and the rest nitrogen. Such a gas mixture is also used in measuring the 50% conversion temperatures. The sulfur poisoning test used herein involved treating the catalyst at high temperature in a gas mixture containing 20 ppm $SO_2$, 1% CO, 2.5% $O_2$, 10% $H_2O$, and about 13% $CO_2$, with the balance nitrogen. The base temperature utilized was 850° F with brief excursions to 1100° F. After treatment for a specified number of hours, the catalyst was then tested by the usual cold start test procedure.

EXAMPLE 4

Catalysts were prepared utilizing the materials and procedures of Example 3, including 8.2 parts urea, but precalcining the alumina support prior to the impregnation, in one case at 1112° F for 5 hours, and in the other to 1400° F for 5 hours. The activity and properties of the resulting materials were comparable to those of Example 3, for example, the cold start indices for the second preparation (with heat conditioning) being 135 for hydrocarbons and 92 for carbon monoxide, and the volume shrinkage after heating at 1100° F being 0.6%. The green material when heated did not appear to give off nitrogen oxide fumes. The material was placed in a furnace at 300° C and the temperature control set to 593° C. The temperature quickly rose over a 15 minute period during which an ammonia odor was evident with possibly a slight odor due to nitrogen oxides. No visible gas evaluation was noted. The catalyst changed color from a blue green to a drab yellow.

EXAMPLE 5

A catalyst was prepared in accordance with Example 3, but only employing 2.05 weight parts urea per 100 weight parts alumina. Properties of the resulting catalyst were comparable to that of Example 3, with the cold start index being 131 for hydrocarbons and 109 for carbon monoxide. When the green catalyst was placed in a 300° C furnace, set to heat to 593° C, acid fumes were detectable in 2 minutes, and visible brown fumes were evident in 5 minutes and persisted for 30 minutes. After 40 minutes (temperature 560° C), no odor or fumes were detected. On a qualitative basis, the observations were similar to those for catalyst with no urea, indicating that the amount of urea was insufficient to suppress all of the $NO_x$ evaluation.

EXAMPLE 6

A catalyst was prepared in accordance with Example 3, but utilizing 4.2 parts by weight urea per 100 parts by weight support. Cold start index values were 133 for hydrocarbons and 109 for carbon monoxide, and other properties were comparable to those of the catalyst in Example 3. Upon heating the greencatalyst in the furnace, a nitrogen oxide odor could be detected after five minutes and some brown fumes were detectable after 10 minutes, and remained visible for 26 minutes. A slight odor was barely detectable at 39 minutes (temperature 535° C.)

EXAMPLE 7

A catalyst was prepared to include a urea-formaldehyde resin as one of its components. The chromium nitrate and palladium nitrate salts were utilized in the same proportions as in Example 3. An aqueous solution was made up to contain urea and formaldehyde in a 1:2 molar ratio and total concentration of about 37%. The solution was made alkaline with ammonium hydroxide and heated to about 45° C to form a dimethylol urea. The solution was acidified with acetic acid, and the solution was utilized on the basis of 22.2 weight parts of the solution being utilized for the 449 grams of support. The solution was diluted to 300 ml., aqueous palladium nitrate and chromium nitrate were added, and the solution diluted to 360 ml. The support was impregnated with the solution. The impregnated material was dried in a rotary unit at 140° C. A portion of the material was placed in a furnace at 300° C. set to heat to 593° C. A formaldehyde odor was noticed in one minute, and an ammonia odor in 6 minutes, but no $NO_x$ fumes were visible or detected by odor. After 9 minutes, no further odor was noticed An uncalcined portion of the catalyst was tested for its activity in the cold start test, with usual conditioning giving an index of 136 for hydrocarbons, and 111 for carbon monoxide. After the catalyst was aged for 36 hours in an $SO_2$ containing stream, as a poisoning test, the index for hydrocarbons was 118 and for carbon monoxide, 95. The 50% conversion temperature for the catalyst was 400° C for hydrocarbons, and 380° C for carbon monoxide. The volume shrinkage at 1100° F was 1.1%. Air jet attrition loss on the green catalyst was 8.8%, and on calcined catalyst, 5.1%. The urea-formaldehyde resin suppressed the $NO_x$ evaluation, and there was good retention of activity and other catalyst properties.

EXAMPLE 8

A forty pound lot of catalyst was prepared to have the composition of the catalyst of Example 3, including the use of 8.2 weight parts urea in the preparation. The impregnation and procedure were similar to that of the other Examples herein, except that the wet impregnate, with no superficial drying, was loaded directly into steel baskets and placed in a pre-heated forced draft furnace for drying. Since the catalyst bed was static, it was necessary to use less stringent temperatures to avoid overheating the bed and to obtain simple drying rather than reaction or decomposition. The resulting green catalyst was tested in the cold start test, with usual temperature conditioning, and had an index for hydrocarbon of 138, and 109 for carbon monoxide. The green catalyst was also tested in a converter in an actual automobile exhaust stream, employing a constant volume sampling procedure to measure emissions, in accordance with the standard Federal cold start test procedure. Two successive measurements were taken. The hydrocarbon emission in both tests was 0.24 grams/mile, while the carbon monoxide was 3.14 grams/mile in the first test, and 2.83 grams/mile in the second test. The results for both hydrocarbons and CO are good, the results for the latter indicating that the first test, under actual use conditions with automobile exhaust gases, further activated the catalyst. The catalyst had an air jet attrition value of 2.9% in the green state, and 2.4% after calcination.

In a similar procedure with a 40-lb. lot of catalyst material, oven gases at 162° C were employed and an exothermic reaction was found to commence at 150°–159° C and continued even after heating was discontinued. The resulting catalyst had cold start indices of 131 for hydrocarbons and 105 for carbon monoxide.

What is claimed is:

1. In a method of preparing a catalyst by forming a mixture of a metal nitrate and catalyst support and heating the mixture to decompose the metal nitrate, the improvement of adding a nitrogen oxide scavenger to the mixture, before heating, in an amount sufficient to scavenge the nitrogen oxide produced upon decomposition of the metal nitrate, the said scavenger being selected from the group consisting of lower carboxylic acid amides containing no more than six carbon atoms and urea-formaldehyde resin.

2. The method of claim 1 in which the catalyst is for treatment of automotive exhaust gases and in which the mixture is heated by contacting same at elevated temperature with exhaust gases from an internal combustion engine.

3. The method of claim 2 in which the mixture includes palladium to provide potential catalytic activity.

4. The method of claim 2 in which the metal nitrate is chromium nitrate.

5. The method of claim 1 in which the mixture is heated to a temperature of about 200° C, and sufficient to substantially decompose nitrates, and completing the preparation of the catalyst by subjecting it to contact with exhaust gases of an internal combustion engine.

6. The method of claim 1 in which the nitrogen oxide scavenger is a lower aliphatic carboxylic acid amide containing no more than six carbon atoms.

7. The method of claim 1 in which the nitrogen oxide scavenger is urea-formaldehyde resin.

8. The method of claim 6 in which the metal nitrate is a mixture of palladium and chromium nitrates.

9. The method of claim 2 in which the nitrogen oxide scavenger is utilized in an amount approximately stoichiometrically equivalent to the nitrate salts.

10. The method of claim 2 in which the mixture includes noble metal to provide potential catalytic activity.

11. The method of claim 6 in which the composition is heated by contact with exhaust gases of an internal combustion engine, thereby decomposing metal nitrate salts.

12. A catalyst precursor composition consisting essentially of an alumina support, palladium and chromium nitrates, and a lower aliphatic carboxylic acid amide containing no more than six carbon atoms in an amount sufficient to scavenge the nitrogen oxide produced upon decomposition of the nitrates, and the nitrate amounts are such that palladium, calculated as metal, is in the range of 0.001 to 0.5 weight parts, and chromium, calculated as metal, 0.1 to 10 weight parts, both per 100 weight parts support.

13. A catalyst precursor composition consisting essentially of an alumina support, palladium and chromium nitrates, and urea-formaldehyde resin in an amount sufficient to scavenge the nitrogen oxide produced upon decomposition of the nitrates, and the nitrate amounts are such that palladium, calculated as metal, is in the range of 0.001 to 0.5 weight parts, and chromium, calculated as metal, 0.1 to 10 weight parts, both per 100 weight parts support.

* * * * *